Aug. 4, 1953  R. H. TISSIER  2,647,503
ADMISSION MANIFOLD FOR INTERNAL-COMBUSTION ENGINES
Filed Sept. 10, 1951  3 Sheets-Sheet 1

Aug. 4, 1953  R. H. TISSIER  2,647,503
ADMISSION MANIFOLD FOR INTERNAL-COMBUSTION ENGINES
Filed Sept. 10, 1951  3 Sheets-Sheet 2

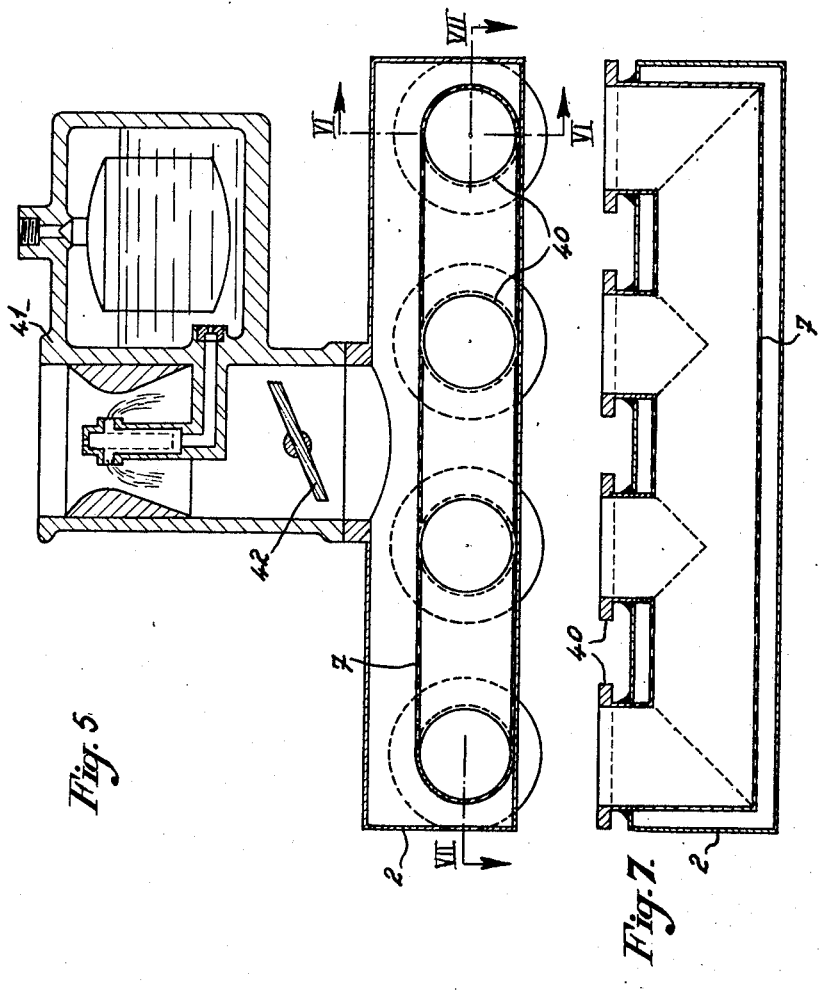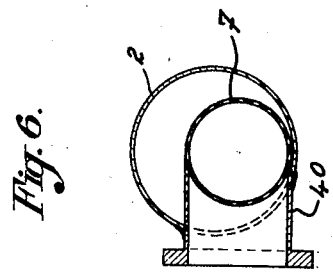

Patented Aug. 4, 1953

2,647,503

UNITED STATES PATENT OFFICE 2,647,503

ADMISSION MANIFOLD FOR INTERNAL-COMBUSTION ENGINES

Roger H. Tissier, Paris, France

Application September 10, 1951, Serial No. 245,869
In France September 16, 1950

5 Claims. (Cl. 123—141)

1

The known admission pipes for internal combustion engines give a bad distribution of fuel in each of the cylinders due to the fact that the atomised fuel is splashed on to the walls and trickles along them, principally at the bends.

Now, it is illogical to provide means for good fuel atomisation in the carburetter and then to offset this by allowing the fuel to be splashed on to the walls of the pipe.

The practice at present adopted in order to obviate this disadvantage is to heat the admission manifold which has the effect of vaporising the fuel and thus rendering the mixture more homogeneous. Unfortunately, the supply of heat lowers the performance by reducing the density of the carburetted mixture, and tends to raise the cylinders to a high temperature.

In order to avoid the said heating and all the aforesaid disadvantages, it has been proposed to employ a number of carburetters mounted on a single admission manifold, but this method is complicated and results in a heavy, bulky and costly construction.

It has also been suggested to inject fuel directly into the cylinders, but this involves a mechanical complication and high cost of production, while reducing the reliability of operation due to the complexity of the means employed.

The present invention has for its object to provide an admission manifold designed to improve the distribution of the fuel without involving any mechanical complication.

This manifold comprises the combination of a permeable internal chamber communicating with the cylinders and of a fluid-tight external chamber surrounding the first chamber and serving at least to feed the air sucked in by the cylinders through the permeable chamber.

The description which follows with reference to the accompanying drawings, which is given by way of non-limitative example, will enable the manner in which the invention can be carried into effect to be readily understood.

Figure 2:
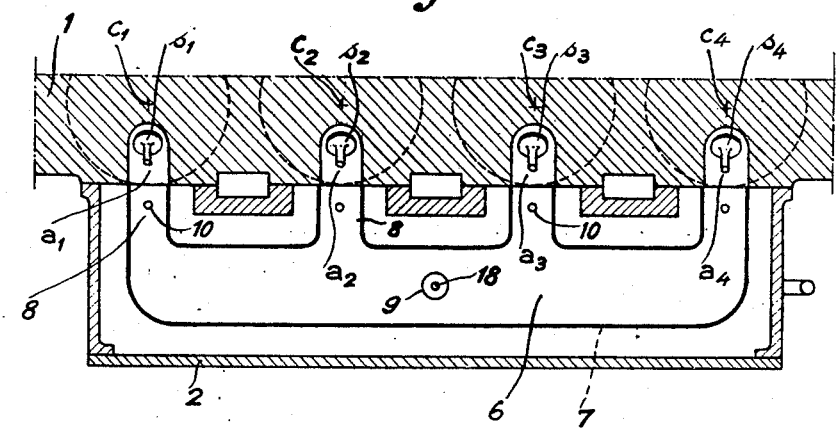
Figure 2 is a section thereof taken along the line II—II of Figure 1.
Figure 3:
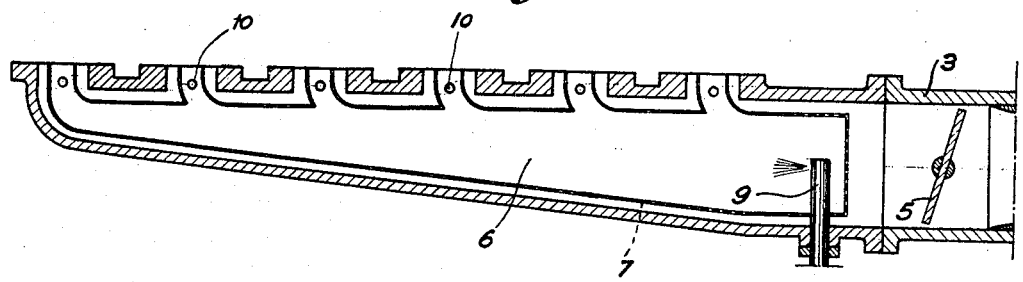
Figure 3 is a section similar to Figure 2 through another constructional form.
Figure 4:
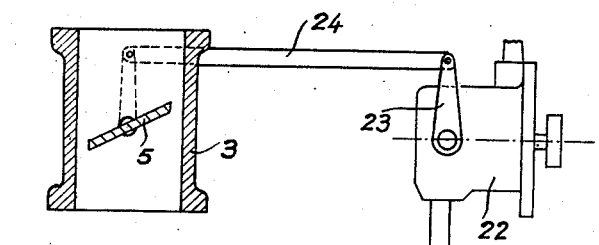
Figure 4:
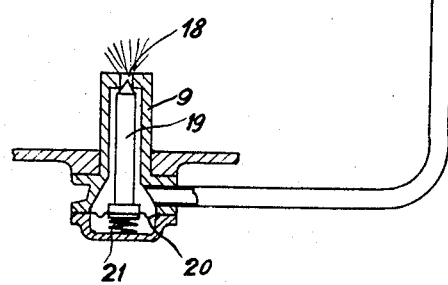

Figure 4 shows a modification of a known device which may be employed for the adaptation of the supplies of air and of fuel to one another in the construction shown in Figures 1 to 3, and Figure 5 is a vertical section, partly in section, of a constructional form of a manifold adapted to be employed with a carburetter of the flat type generally employed in motor-cars. In this figure, the manifold is assumed to be fitted to a four-cylinder engine.

Figures 6 and 7 are sections thereof on the lines VI—VI and VII—VII.

Figure 1:
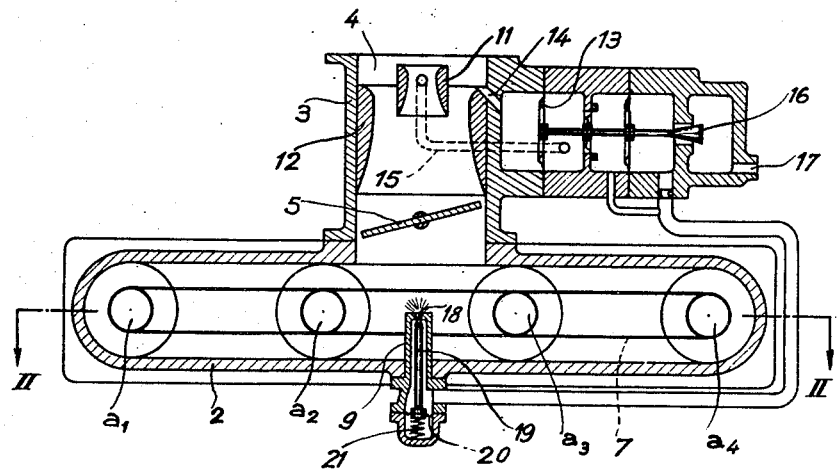
Figure 1 shows a section taken along a line parallel to the axis of the cylinders through a first constructional form of the invention.

The constructional form shown in Figures 1 and 2 is assumed to be applied to a four-cylinder engine. In Figure 2, the axes of these cylinders are projected at $c_1$, $c_2$, $c_3$, $c_4$ and the admission valves, which are assumed to be situated in overhead fashion in the cylinder head, are projected at $s_1$, $s_2$, $s_3$, $s_4$. The admission manifold secured to the side wall 1 of the cylinder head, which has admission passages $a_1$, $a_2$, $a_3$, $a_4$ formed therein, is composed of two concentric chambers or canalisation systems. One of these chambers 2 which is fluid-tight, constitutes the actual admission duct, and is fed with pure air through a sleeve 3 open to the atmosphere at 4 and associated with a butterfly valve 5 serving to control the air feed. The other chamber 6 is bounded by a permeable wall consisting, for example, of a metal gauze 7 disposed at a distance from the inner wall of the chamber 2, designed in the form of a tube closed at its two ends and communicating through tubular parts 8 with the admission passages $a_1$, $a_2$, $a_3$, $a_4$ of each of the cylinders. The fuel injector or atomiser 9 opens into the interior of the permeable chamber 6. The control of the air supply effected by the butterfly valve 5 and the control of the fuel supply through the injector 9 are naturally adapted to one another by a suitable device, constructional forms of which will be described in the following.

The current of air sucked in by the engine through the sleeve 3 is obliged to pass through the metal gauze 7 in order to penetrate into the cylinders. This current of air, which passes through the metal gauze from the outside to the interior of the chamber 6 which it bounds, prevents the splashing of particles of fuel on to the inner walls of the chamber 2 and on to the metal gauze itself, and vaporises any drops which may continue to adhere to the metal gauze. It increases the turbulence within the admission manifold and assists in maintaining homogeneity of the carburetted mixture by preventing precipitation thereof on the walls.

The metal gauze may be of uniform or variable fineness, it being possible to determine when tuning each engine whether it is necessary for the permeability to be varied in the various portions of the manifold.

In some cases, the chamber 6 may comprise solid portions, the metal gauze being employed only at points of this chamber where the danger of precipitation of the atomised fuel is greatest. The distribution of the fuel in the various cylinders may be improved by forming in the chamber 6, in the neighbourhood of the admission passages $a_1$, $a_2$, $a_3$, $a_4$, of the various cylinders, holes such as 10 which are larger than the normal perforations of the metal gauze to permit the entry of pure air, these holes differing in the various cylinders in accordance with the requirements revealed in the tuning of the engine.

It is obvious that the metal gauze could be replaced by any other equivalent means, the important requirement being to provide an air-permeable wall. For example, a fabric having suitably spaced dimensioned perforations could be employed.

Figure 1 shows an arrangement which is well known in itself, and by means of which the air supply and the fuel supply can be adapted to one another. In accordance with the principle of the injection carburetter, this arrangement is operated by a negative pressure set up by the current of air within a small venturi 11 disposed on the axis of the sleeve 3 and terminating close to the neck of a venturi 12 of larger diameter which is secured to the inner wall of the said sleeve. A diaphragm 13 embedded in fluid-tight fashion at its edge is subjected on one side, through the passage 14, to the total pressure obtaining on the upstream side of the larger venturi, and on the opposite side, through the passage 15, to the depression obtaining at the neck of the smaller venturi, which depression varies according to the degree of opening of the butterfly valve 5. The said diaphragm therefore opens to a variable extent the gasoline valve 16 disposed between the injector 9 and the gasoline feed orifice 17 connected to a pump or to a gravity-feed tank. The atomising orifice 18 of the injector 9 is controlled by a needle valve 19 which is open to an extent varying in accordance with the pressure exerted by the petrol on a diaphragm 20 connected to the said needle valve and loaded by a spring 21.

Other arrangements could naturally be adopted, such as that shown in Figure 4, which is also known and in which the gasoline is supplied to the injector 9 by a pump 22 driven by the engine and provided in the known manner with a member for controlling the supply, which is actuated by a lever 23 connected by the throttle lever 24 to the air-control butterfly valve 5, so that the delivery of the pump varies in accordance with the degree to which the said butterfly valve is opened.

The modified construction shown in Figure 3 is assumed to be applied to a six-cylinder engine. The fuel injector or atomiser 9 is disposed at the end of the wire gauze chamber 6 near to the air inlet 3, instead of having a central position as in the previous construction.

The details described in the foregoing also apply to this form of construction.

In the construction form shown in Figures 5 to 7, the manifold consists of two chambers, namely the external fluid-tight chamber 2 and the permeable chamber 7 which is situated in the interior thereof and the walls of which may consist, for example, of perforated sheet metal.

The permeable internal chamber 7 communicates through tubular parts 40 with the admission passages of the engine. This chamber 7 will preferably be so positioned that it is tangential to the base of the outer chamber 2, which base is preferably horizontal and has no lower point.

The supply of air-gasoline mixture provided by the normal float-type carburetter 41 is controlled by the butterfly valve 42. Owing to the depression obtaining in the chamber 7, this mixture is drawn into the said chamber. The volatilised gasoline passes through the perforation in the said chamber, while the gasoline which has remained in liquid form is projected by the current of air on to the outer wall of the said chamber 7, over which it trickles to a point opposite the holes, where it is violently sucked up by the depression and penetrates into the interior, in which owing to the great turbulence obtaining in the chamber, it is rapidly and intimately mixed with the feed air which is already more or less carburetted.

Should the whole of the gasoline supplied by the carburetter not be drawn against the outer wall of the chamber 7, part of this fuel would fall back to the lower part of the outer chamber 2 and would be taken up within the interior of the chamber 7, since the latter is tangential at its lower part to the base of the outer chamber.

In all cases, the fuel delivered will be directly subjected to the extreme turbulence obtaining in the chamber 7, and consequently the mixture contained in this chamber will be practically homogeneous, which will result in a correct distribution of the air and of the fuel in each of the cylinders of the engine.

Finally, in the extreme cases where too great a proportion of the gasoline delivered falls to the bottom of the outer chamber 2, it would be possible to promote the vaporisation thereof by the conventional heating methods applied to the outer wall of this chamber 2. This heating may be effected, as is well known, either by the exhaust gases or by circulation of hot water from the radiator or in any other manner.

Although Figures 5 to 7 are assumed to be applied to the case of a four-cylinder engine, it is obvious that a similar arrangement could be applied to the feeding of an engine having a different number of cylinders.

Similarly, the arrangement shown in Figures 5 to 7 could be applied to an engine comprising admission passages common to two consecutive cylinders. Thus, in the case of a four-cylinder engine having common admission passages for the first and second cylinders and for the third and fourth cylinders, the number of tubular parts 40 would be reduced to two.

In Figures 5 to 7, the chambers 2 and 7 are of circular section, but any other sectional form would obviously be possible. In any case, it is desirable that the internal chamber 7 should remain tangential to the base of the outer chamber 2, the latter preferably having no lower point.

What I claim is:

1. The combination with internal combustion engine cylinders provided with fuel mixture intake passages, of a fluid-tight enclosure including an inlet passage, and a permeable wall inside said enclosure, dividing same into an inner chamber bounded by said permeable wall and an outer chamber around same, said intake passages opening into said inner chamber and said inlet passage opening into said outer chamber.

2. The combination with internal combustion engine cylinders provided with fuel mixture intake passages, of a fluid-tight enclosure, a permeable wall inside said enclosure, dividing same into an inner chamber bounded by said permeable wall and an outer chamber around same, said intake passages opening into said inner chamber, an air inlet passage opening into said outer chamber, and fuel injecting means opening into said inner chamber.

3. The combination as claimed in claim 2, wherein the permeable wall is constituted by metal gauze.

4. The combination as claimed in claim 2, further comprising means for controlling the flow of air through the air inlet passage and means for controlling the flow of fuel through the fuel injecting means, said controlling means being associated with each other to operate in conjunction.

5. The combination as claimed in claim 2, wherein the inner chamber is of generally circular cross section and the permeable wall bounding it is tangential to the base of the enclosure.

ROGER H. TISSIER.

References Cited in the file of this patent

UNITED STATES PATENTS

| Number | Name | Date |
|---|---|---|
| 1,261,230 | Haynes | Apr. 2, 1918 |
| 1,490,920 | Godward | Apr. 22, 1924 |
| 1,798,492 | Plourde | Mar. 31, 1931 |
| 1,801,446 | Muhr | Apr. 21, 1931 |
| 2,097,216 | Schreurs | Oct. 26, 1937 |